US011102622B1

(12) United States Patent
Haggerty (10) Patent No.: US 11,102,622 B1
(45) Date of Patent: Aug. 24, 2021

(54) BEST TIME TO SEND LIMITED-CONTENT TEXT MESSAGES TO PARTIES

(71) Applicant: Noble Systems Corporation, Atlanta, GA (US)

(72) Inventor: Christopher S. Haggerty, Atlanta, GA (US)

(73) Assignee: Noble Systems Corporation, Atlanta, GA (US)

( * ) Notice: Subject to any disclaimer, the term of this patent is extended or adjusted under 35 U.S.C. 154(b) by 30 days.

(21) Appl. No.: 16/723,309

(22) Filed: Jan. 20, 2020

(51) Int. Cl.
*H04W 4/12* (2009.01)
*H04L 12/58* (2006.01)
*H04M 3/523* (2006.01)
*G06N 5/04* (2006.01)

(52) U.S. Cl.
CPC .............. *H04W 4/12* (2013.01); *G06N 5/04* (2013.01); *H04L 51/26* (2013.01); *H04M 3/5238* (2013.01)

(58) Field of Classification Search
USPC .......................................................... 709/206
See application file for complete search history.

(56) References Cited

U.S. PATENT DOCUMENTS

| | | | |
|---|---|---|---|
| 5,802,161 | A | 9/1998 | Svoronos et al. |
| 7,805,395 | B2 | 9/2010 | Howard et al. |
| 9,781,264 | B1 | 10/2017 | Noble, Jr. et al. |
| 2012/0158412 | A1 | 6/2012 | Dorai et al. |
| 2013/0060587 | A1* | 3/2013 | Bayrak ............... G06Q 10/10 705/7.11 |
| 2013/0329880 | A1 | 12/2013 | Bentley et al. |
| 2015/0003602 | A1 | 1/2015 | Bulbul et al. |
| 2017/0308808 | A1* | 10/2017 | Kobylkin .............. G06Q 30/02 |
| 2019/0173968 | A1* | 6/2019 | Yue ........................ H04L 67/26 |
| 2019/0213476 | A1* | 7/2019 | Singh .................. G06N 3/0445 |
| 2020/0364588 | A1* | 11/2020 | Knox .................. G06K 9/6268 |

OTHER PUBLICATIONS

CallTech 3.6.5 Administrator Guide, 2018, 89 Pages.
CallTech 3.6.5 Population Manager, 2018, 35 Pages.
Office Action Received for U.S. Appl. No. 14/311,432 dated Oct. 7, 2015.
Notice of Allowance Received for U.S. Appl. No. 14/311,432 dated May 12, 2016.

(Continued)

*Primary Examiner* — Tonia L Dollinger
*Assistant Examiner* — Jonathan A Sparks
(74) *Attorney, Agent, or Firm* — Blank Rome, LLP (57) ABSTRACT

Technologies are disclosed for determining a best time to send a text message to a party over a plurality of contact periods of time to achieve having the party respond to the message with a desired outcome and/or result. Various embodiments of the invention involve determining, for each period of time, an amount of time the party is expected to take to respond to the text message, a cost of sending the message, and a probability of the party responding with the desired outcome and/or result as a result of sending the message during the period of time. A contact attempt value is determined for each period of time based on these variables along with a desirability of sending the message to the party during the period of time. Accordingly, the best time to send the message is identified as the period of time having the highest contact attempt value.

21 Claims, 5 Drawing Sheets

(56) References Cited

OTHER PUBLICATIONS

Office Action Received for U.S. Appl. No. 15/064,779 dated Jan. 13, 2017.
Notice of Allowance Received for U.S. Appl. No. 15/064,779 dated Jun. 27, 2017.
Office Action Received for U.S. Appl. No. 15/064,779 dated May 24, 2017.
Notice of Allowance Received U.S. Appl. No. 15/646,145 dated Aug. 15, 2017.

* cited by examiner

BEST TIME TO SEND LIMITED-CONTENT TEXT MESSAGES TO PARTIES

BACKGROUND

The Consumer Financial Protection Bureau ("CFPB") has proposed new rules governing activities of debt collectors that impose various communication limitations on third-party debt collectors. For instance, the new rules propose a limit of seven telephone call attempts that can be placed to a debtor within a seven-day period. Further, the debt collector is limited from engaging in more than one telephone conversation with a debtor regarding a particular debt within a seven-day period.

However, despite these limitations, the new rules also provide debt collectors with a new mechanism for contacting debtors known as "limited-content messages." Those acquainted with debt collection will be familiar with the concept of a "limited-content message" as specified by the CFPB. These limited-content messages can be voice or text based and do not constitute a prohibited third-party disclosure of a debt if heard or read by someone other than the debtor. In addition, the new rules do not limit the number of these messages that can be sent as text to a debtor without any seven-day cap.

Accordingly, a limited-content text message refers to a text message that qualifies as a limited-content message and is normally sent by a contact center operated by a debt collector to a debtor. To qualify as a limited-content message, the text message must include the debtor's name, a request for the debtor to reply to the message, the name or names of one or more natural persons who the debtor can contact, a telephone number that the debtor can use to reply, and one or more ways the debtor can opt out of receiving any further electronic communications from the debt collector. In addition, certain information that may be optionally included in the text message is a salutation, the date and time of the message, a generic statement that the message relates to an account, and suggested dates and times for the debtor to reply to the message.

In the context of a contact center, the name of the person identified in the text message who the debtor is to contact is normally an agent employed by the contact center. It is permissible to use an alias for the agent. However, if an alias is used, the alias must be consistently used and must not interfere with the ability of the debt collector to identify the particular agent referenced in the text message. That is to say, it is not acceptable for a limited-content text message to inform the debtor that he or she should reply back to "John" or "John Smith," wherein any agent can be identified as such in the contact center. Rather, a one-to-one correlation between an alias and a particular agent should exist. Accordingly, a contact center may make use of a limited-content text message to prompt a debtor to call the contact center.

However, identifying an optimal time to send a limited-content text message to a particular debtor is not trivial. That is to say, identifying the right time to send a limited-content text message to a particular debtor that will succeed in enticing the debtor to place a call into a contact center is not trivial. For instance, the contact center may send a limited-content text message to an account that is successfully delivered to the person associated with the account's phone. However, the person may be too busy to place a call to the contact center at that time. Therefore, although the contact center was successful in reaching the person associated with the account, the end result was unsuccessful because the center was unable to entice the person to place an inbound call to the contact center. The contact center may consider sending additional text messages to the person's phone until the person places a call to the contact center. However, the contact center may then run the risk of becoming a nuisance, resulting in the person opting out of receiving any further texts from the contact center.

Accordingly, organizations who want to utilize sending limited-content text messages to parties are often concerned with the best time to send such text messages to these parties. A best time to send such a text is considered the right time to send a text to the right party and get the right outcome and/or result (e.g., having the party place an inbound call). Therefore, a need exists in the art for better identifying the best time to send a limited-content text message to a party. It is with regard to this and other aspects that the present disclosure is presented.

BRIEF SUMMARY

Technologies are generally presented herein pertaining to determining a best time to send a text message to a party over a plurality of contact periods of time to achieve having the party respond to the text message with at least one of a desired outcome and a desired result. For example, the plurality of contact periods of time may be made up of consecutive one-hour segments of time, the desired outcome is for the party to place an inbound call to a contact center, and the desired result is to have the party provide a promise-to-pay on a delinquent account while on the call with the contact center. Therefore, in this example, technologies are generally presented herein for determining which of the these consecutive one-hour segments of time is the best time to send the text message to the party that will result in the party responding to the text message by placing an inbound call to the contact center and/or providing a promise-to-pay on a delinquent account while on the call with the contact center.

Accordingly, various embodiments of the invention involve determining an amount of time the party is expected to take to respond to a text message sent during each contact period of time, along with a cost of sending the text message and a probability of the party responding to the text message with the desired outcome and/or result. At this point, a contact attempt value is determined for each contact period of time based on these variables to identify the best time to send the text message to the party. For instance, in particular embodiments, a contact attempt value is determined for each contact period of time based on the probability of the party responding to the text message being sent during the contact period of time with the desired outcome and/or result, the resources available for handling the desired outcome and/or result during a time when the party is expected to respond to the text message based on the amount of time the party is expected to take to respond to the text message, and the cost of sending the text message to the party. In addition, the contact attempt value in particular embodiments may also be based on a desirability of sending the text message to the party during the contact period of time. In particular instances, the party may be one of a plurality of parties to receive text messages and this desirability may be relative to a desirability of sending a text message to each of the plurality of parties during the contact period of time. Once the contact attempt values have been determined, the best time to send the text message to the party is identified as the contact period of time having the highest contact attempt value.

The subject matter disclosed herein may be implemented as a computer-controlled apparatus, a computer process, a computing system, or as an article of manufacture such as a computer readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Contact Center Architecture

Figure 1:
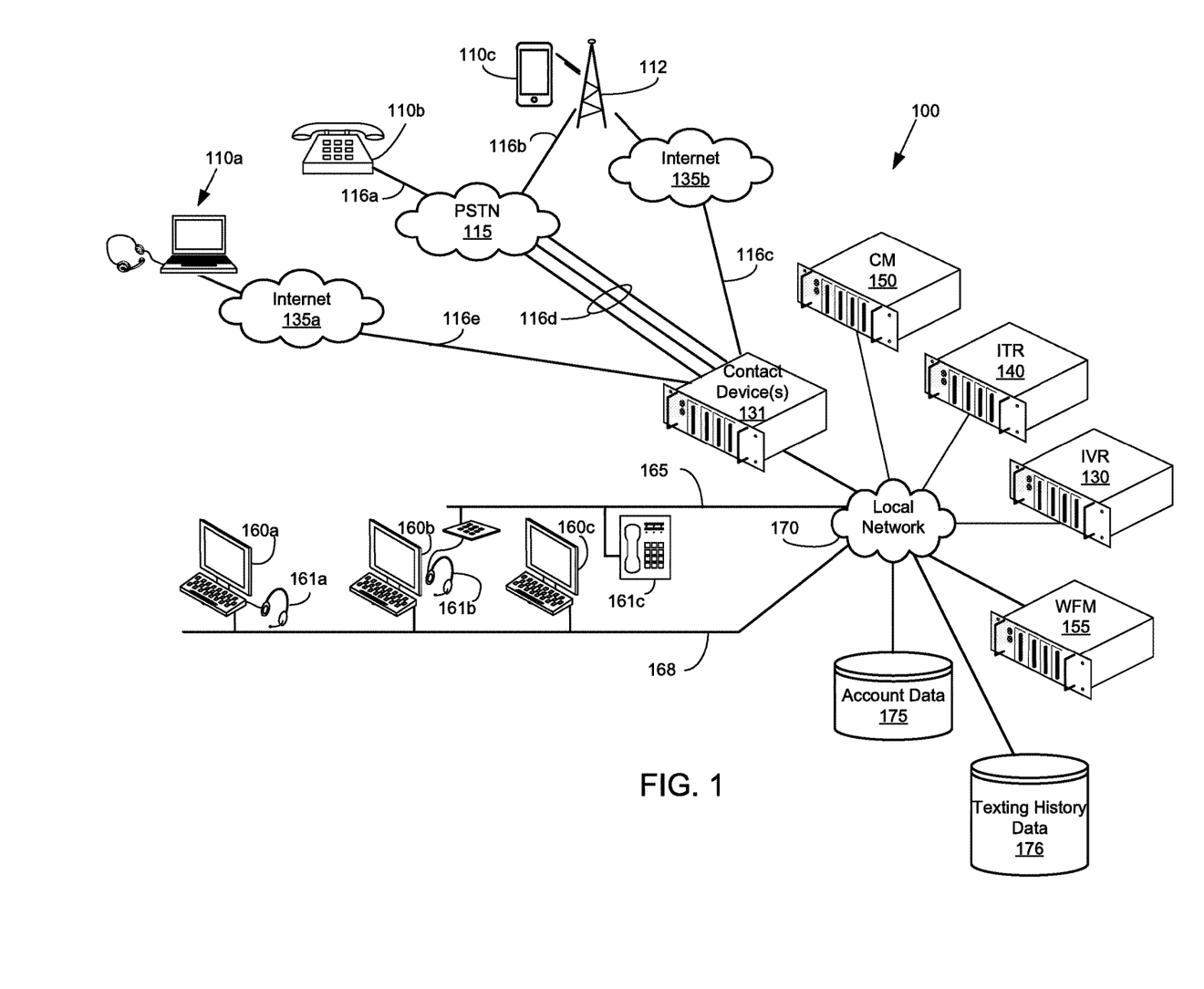
FIG. 1 shows one embodiment of a contact center architecture that may be used in accordance the various technologies disclosed herein.

FIG. 1 shows one embodiment of a contact center architecture 100 illustrating the various technologies disclosed herein. The contact center architecture 100 shown in FIG. 1 may process various channels of communication such as voice calls, facsimiles, emails, text messages, video calls, Web chats, etc. that generally make up a combination of both inbound and outbound traffic (sometimes referred to as a "blended" contact center). In particular instances, the contact center may be referred to as a call center. However, for purposes of this disclosure, the term "contact center" is used throughout, although it is understood that the two are synonymous.

With that said, the contact center may handle communications originating from a remote party or initiated to a remote party. Thus, the term "party," without any further qualification, refers to an individual associated with a communication processed by the contact center, where the communication is either received from or placed to the party.

Depending on the embodiment, communications may originate to or be received from parties that use a variety of different devices. For instance, a party may receive or place a voice call using a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of communications.

In addition, a party may receive or place a communication using a device such as a desktop or laptop computer 110a, a smart phone 110c, mobile phone, tablet, or other mobile device. Depending on the device, these communications may be placed or received via an Internet provider 135a, 135b and/or wirelessly via a mobile service provider ("MSP") 112. For instance, communications may be routed to the PSTN 115 using an integrated services digital network ("ISDN") interface 116b or other type of interface that is well known to those skilled in the art. While in other instances, the MSP 112 may route communications as packetized data to/from an Internet provider 135b using Internet-based protocols. For convenience, unless indicated otherwise, the term "trunk" refers to any type of facility 116c, 116d, 116e providing communication to, or from, the contact center, regardless of the type of protocol or technology used. Specifically, a "trunk" is not limited to time-division multiplexing ("TDM") technology. Those skilled in the art will recognize that a variety of protocols and facilities may be used to convey communications.

Accordingly, the contact center may implement various contact devices 131 for initiating and receiving communications based on the channel of communication. For instance, in various embodiments, communications such as inbound calls and/or inbound text messages are received from parties by a contact device 131 such as an automatic call distributor ("ACD"). In particular embodiments, the ACD may be a specialized switch for receiving and routing inbound calls and/or text messages under various conditions. Further, the ACD may be embodied as a dedicated form of equipment readily available from various manufacturers, or the ACD may be a so-called "soft switch" comprising a suitable programming module executed by a processing device to perform the necessary functions. The ACD may route an incoming call and/or text message over contact center facilities 165, 168 to an available agent. Depending on the embodiment, the facilities 165, 168 may be any suitable technology for conveying the call and/or message, including but not limited to a local area network ("LAN"), wide area network ("WAN"), ISDN, and/or conventional TDM circuits. The exact details typically depend in part on the technology used. For example, in one embodiment, first facilities 165 may be analog or proprietary voice communication technology whereas second facilities 168 may be SIP oriented. As may be appreciated, there are various technologies and configurations that are possible. In addition, the facilities 165, 168 may be the same or different from the facilities used to transport the call and/or message to the ACD.

Depending on the embodiment, the ACD may place a call and/or text message in a queue if there is no suitable agent available. Further, the ACD may route a call to an interactive voice response system ("IVR") 130 to play voice prompts and/or may route a text message to an interactive text response system ("ITR") 140 to send message prompts. Depending on the embodiment, these prompts may solicit information from the party and the IVR 130 and/or ITR 140 may collect and analyze responses from the party in the form of dual-tone multiple frequency ("DMTF") tones, speech, and/or text. In addition, the IVR 130 and/or ITR 140 may be used to further identify the purpose of the call or text message, such as, for example, prompting the party for an individual's name (agent's name), to provide account information, and/or otherwise to obtain information used to service the call or text message. Further, in particular embodiments, the IVR 130 and/or ITR 140 may interact with other components, such as a data store 175, to retrieve or provide information for processing the call or text message.

Continuing on, in various embodiments, communications such as outbound calls and/or outbound text messages may be sent using another contact device 131 such as a dialer (e.g., predictive dialer). Again, the dialer may be embodied as a dedicated form of equipment readily available from various manufacturers, or the dialer may be a so-called "soft switch" comprising a suitable programming module executed by a processing device to perform the necessary functions. Accordingly, a predictive dialer is a type of dialer that may originate calls and/or text messages to multiple telephone numbers simultaneously with the expectation that agents will be available to handle one or more of the calls that are answered and/or text messages that are responded to. For instance, in particular embodiments, the dialer may be configured to send text messages to one or more lists of telephone numbers to initiate limited-content text messages. The lists of telephone numbers (e.g., "texting lists") may be generated based on a number of accounts stored in some type of storage media 175 that is accessible using a local network 170. In addition, in particular instances, the dialer or some other component within the contact center architecture 100 may retrieve texting history information stored in some type of storage media 176 that is used in generating optimal schedules for sending text messages to the telephone numbers found on the texting lists.

Depending on the embodiment, other contact devices 131 may be used for originating and/or receiving other channels of communication such as Web chats, emails, text messages, etc. For example, the contact center may make use of a web server to host Web pages and interact with parties via Web chats. In addition, the contact center may make use of an email server to receive and send emails from parties. While in other embodiments, the contact center may convey and/or receive text messages to/from a gateway instead of an ACD or dialer, which then conveys the messages to the Internet 135*b* and on to a mobile service provider 112. In these particular embodiments, such a gateway may provide a way for the contact center to send and/or receive text messages that are not in a native protocol and can be accepted or conveyed by the mobile service provider 112.

In addition, in various embodiments, the contact center may make use of a campaign monitoring system ("CM") 150 to monitor active campaigns and to direct the contact devices 131 on pacing outbound communications to various parties. Depending on the embodiment, the CM 150 may keep track of various information used to pace outbound communications accordingly. For instance, the contact center may wish to send out text messages to multiple parties requesting the parties to call the contact center. Here, the CM 150 may determine when and how such text messages should be sent based on when the calls are expected to be received from the parties and the availability of resources (e.g., agents) to handle the calls when received. The CM 150 may then direct the corresponding contact device 131 to send the text messages accordingly.

Further, an agent at the contact center typically uses a computing device 160*a*-160*c*, such as a personal computer, and a voice device 161*a*-161*c* to handle communications. The combination of computing device 160*a*-160*c* and voice device 161*a*-161*c* may be referred to as a "workstation." However, in particular embodiments, the computing device 160*a*-160*c* may also handle voice (e.g., VoIP) or voice capabilities may not be needed so that reference to an agent's "workstation" may only refer to a computing device 160*a*-160*c* without the use of a separate voice device 161*a*-161*c*.

Agents typically log onto their workstations prior to handling communications and this allows the contact center to know which agents are available to potentially receive communications. In particular embodiments, the contact center may also maintain information on each agent's skill level that may be used to route a specific communication to an agent or group of agents having the same skill level.

Depending on the embodiment, interaction between a contact device 131, as well as other components within the contact center architecture 100, and agent's workstation may involve using a local area network ("LAN") 170. In addition, in particular embodiments, an agent may interact with components that provide information to the agent's workstation. For example, when a communication is directed to an agent, information about the party on the communication may be presented to the agent's computer device 160*a*-160*b* over the LAN 170 using facility 168.

Finally, another component that is employed in the contact center architecture 100 shown in FIG. 1 is a workforce management system ("WFM") 155. In various embodiments, the WFM 155 maintains information and generates agents' schedules to effectively handle inbound/outbound communications. For instance, in particular embodiments, the WFM 155 maintains historical communication volume information for various types of communication campaigns and generates forecasts for expected communication volume based on the historical information to predict the number of agents needed to handle the communication volume at a defined service level. The WFM 155 then applies the forecasts and information about available agents to generate work rosters of agents (e.g., schedules). That is to say, the WFM 155 schedules agents for work shifts according to the anticipated needs of the communication campaigns.

Although a number of the above entities may be referred to as a "component," each may also be referred to in the art as a "computing device," "unit," "server," or "system." A component may incorporate a local data store and/or interface with an external data store. Use of the word "server" does not necessarily require the component to interact in a formal client-server arrangement with other components, although that may be the case. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication or software service (a so-called "communication-as-a-service" ("CaaS") or "software-as-a-service" ("SaaS")) to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in the art will recognize FIG. 1 represents one possible configuration of a contact center architecture 100, and variations are possible with respect to the protocols, facilities, components, technologies, and equipment used.

Best Time to Text

As mentioned above, organizations who want to utilize limited-content text messages to generate contacts with parties are often concerned with the best time to send limited-content text messages to these parties in which a best time to text is considered the right time to send the text message to the right party and get the right outcome and/or result. Accordingly, a best time to text is generally associated with an outbound text placed to a particular party at a particular time as determined as the right time to text the party to ensure the best chance of reaching the party and getting the desired outcome and/or result.

However, with that said, many organizations may be concerned with the best time to contact parties with regard to using other forms of communication. For instance, limited-content communications are not confined to just text messages. These type of communications may also encompass a telephone call in which a limited-content message is left on a recipient's voicemail. Therefore, a particular organization who may wish to contact one or more parties by leaving a voicemail message may be concerned with the best time to call these parties that would ensure the best chance of the voicemail messages being listened to by these parties and generating the desired outcome and/or result. Thus, it should be understood by those of ordinary skill in the art that although the remainder of this disclosure describes various embodiments of the invention with regard to identifying the best times to originate limited-content text messages to various parties, the application of the various technologies described herein are not limited solely to originating text messages and may be used in the context of originating other forms/types of communication.

Process Overview

Figure 2:
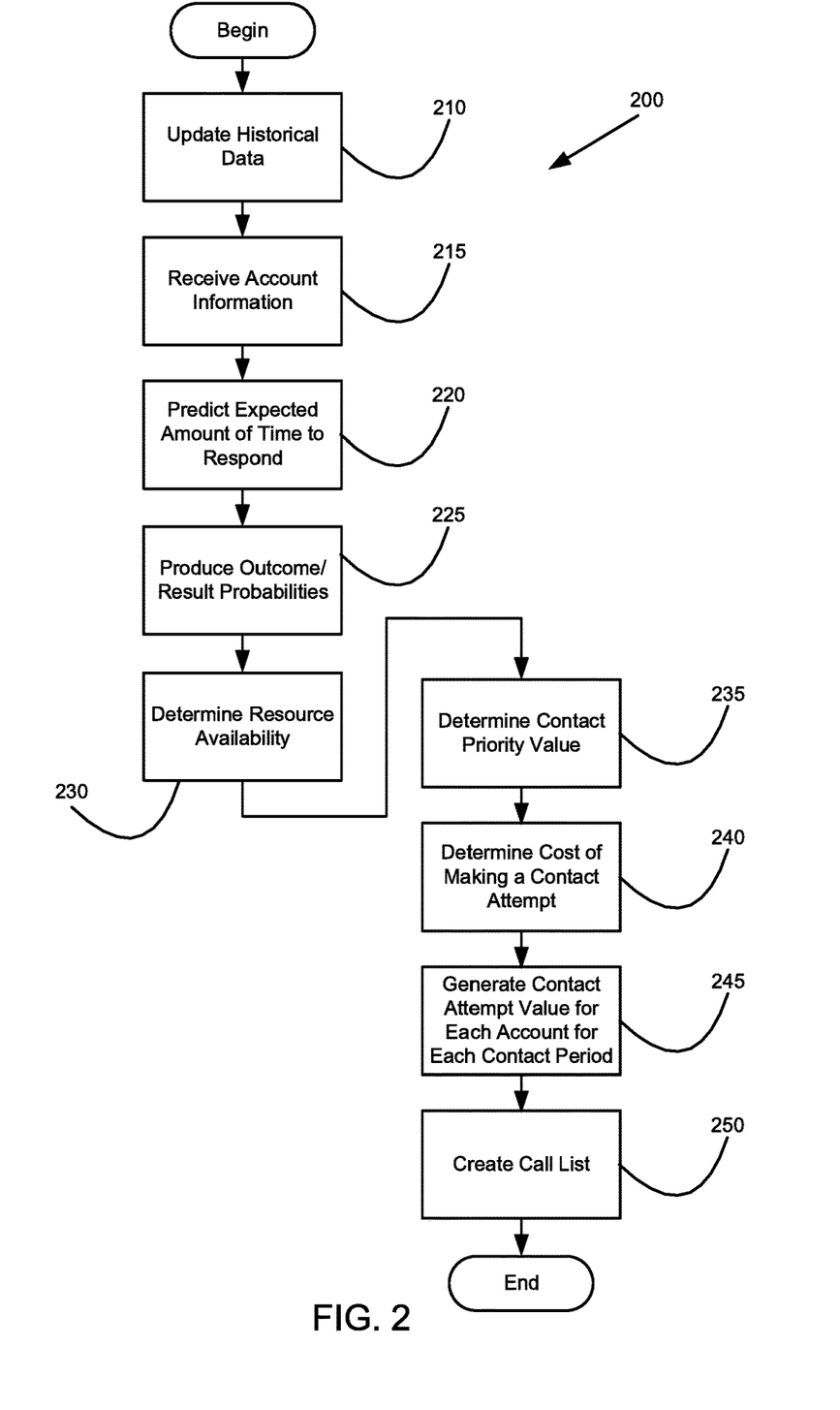
FIG. 2 illustrates a general process flow for producing a texting list in accordance with various embodiments of the invention.

Turning now to FIG. 2, a general process flow for producing a texting list in accordance with various embodiments is shown. An example is now provided to assist in explaining the process flow. In this example, a contact center is conducting daily campaigns for collection purposes. Accordingly, the contact center processes a texting list of telephone numbers each workday that are associated with delinquent accounts. For example, the texting list of telephone numbers may be associated with accounts for individuals who are currently delinquent on at least one payment for a car loan. Thus, the contact center's goal is to collect on as many delinquent accounts as possible during the workday. That is to say, the contact center's goal is to text each account at the right time during the workday to entice the intended party to place a call to the contact center and provide a promise-to-pay on the delinquent account (e.g., send a limited-content text message to each account at the best time to text).

Therefore, looking at FIG. 2, the process 200 begins with uploading contact attempt data from the previous workday and updating the historical contact attempt data accordingly in Step 210. In general, the contact attempt data for a particular workday provides information on the contact attempts made for various accounts on the particular workday. For instance, the contact attempt data may include information such as the accounts that the contact center sent limited-content text messages to for the particular workday, the time of day each text was sent, and/or the outcome and/or result of each text sent to an account.

In various embodiments, this particular step of the process 200 may be carried out routinely during a time that does not interfere with contact center operation. For example, the contact center may run a "batch job" nightly that uploads the contact attempt data from the previous workday, formats the data accordingly, and then loads the data along with the historical contact attempt data. The historical call attempt data may be stored in any number of different types of data structures such as, for example, one or more databases or files, and these data structures may reside on any number of different types of data storage media. Further, the historical call attempt data may encompass information on any number of previous contact attempts made by the contact center during any length of past time period as deemed appropriate by the contact center.

Continuing with the process 200, account information is received on a set of accounts to be sent content-limited text messages for the workday in Step 215. Depending on the embodiment, the account information may include different pieces of information with respect to each account. For instance, the account information for a particular account may include information on the individual associated with the account, information on the delinquency of the account such as the amount delinquent and the time length of the delinquency, contact information on different devices such as a home phone, a work phone, a cell phone, etc., and/or information on the last content-limited text message sent for the account such as the date and time the text message was sent and the outcome and/or result of sending the message. Those of ordinary skill in the art can envision other types of information that may be included in the account information in light of this disclosure.

The next Step 220 of the process 200 involves predicting an amount of time the party associated with each account is expected to take before responding to the text message. Depending on the embodiment, the expected amount of time to respond may be determined using different approaches. For instance, in particular embodiments, the expected amount of time to respond may be determined for an account based on an average amount of time that elapsed to respond to previous limited-content messages sent to the account. While in other embodiments, the expected amount of time to respond may be determined for an account using some type of predictive model and the account information. Those of ordinary skill in the art can envision other mechanisms for predicting the expected amount of time to respond for an account based on this disclosure.

In addition, depending on the embodiment, the expected amount of time to respond may be predicted for each account for each contact period of the workday. A contact period may be defined as any duration of time that occurs during the workday. For instance, in one embodiment, the contact center's workday may be from 8:00 a.m. to 8:00 p.m. and the contact periods are defined as hourly periods. Thus, in this instance, the contact center's workday consists of twelve different hourly contact periods with the first contact period starting at 8:00 a.m. and ending at 8:59 a.m. and the twelfth contact period starting at 7:00 p.m. and ending at 8:00 p.m. In other instances, the contact periods for a workday may be defined differently such as two-hour periods of time or half-hour periods of time. While in other instances, the contact periods for a workday may vary over the length of the workday. For example, in one embodiment, the contact center may define the contact periods for a first portion of the work day starting at 8:00 a.m. and ending at 1:59 p.m. as two-hour periods of time and the contact periods for a second portion of the work day starting at 2:00 p.m. and ending at 8:00 p.m. as hourly periods of time.

At this point, the process 200 continues with producing outcome/result probabilities for each account and contact period of the workday in Step 225. In various embodiments, the contact center is interested in the probabilities of different outcomes occurring as a result of sending a limited-content text message to each account during each contact period. With respect to sending a limited-content text message to an account during a contact period, typically three types of outcomes are of interest. The first outcome is the party associated with the account responds to receiving the text message by placing a call to the contact center. This outcome is referred to as an inbound call ("IC"). The second outcome is the party associated with the account responds to the text message by replying with a text message. This outcome is referred to as an inbound text ("IT"). While the third outcome is the party associated with the account does not respond at all to the text message. This outcome is referred to as a no response ("NR").

In various embodiments, the contact center may also be interested in the probability of a particular result (e.g., the party providing a promise-to-pay or requesting to opt-out of any future text messages) occurring from an IC or an IT. For instance, in particular embodiments, the contact center may be interested in the probability of a particular result occurring from an IC or an IT for a particular account with respect to each contact period for the workday, resulting in multiple result probabilities for the particular account comprising a result probability for each outcome for each contact period of the workday for the particular account. While in other embodiments, the contact center may be interested in the probability of getting a result (e.g., a promise-to-pay or an opt-out request) for the particular account when an IC or IT occurs, regardless of which contact period the IC or the IT occurred in, resulting in a single result probability for each outcome for the particular account.

In many instances, the approach used by the contact center may be dependent on the amount of historical contact attempt data that is available. For example, a contact center may not have enough historical contact attempt data available with respect to determining a probability of a particular result occurring from an IC or an IT in each contact period because historically speaking for any one account, contact periods may exist in which too few ICs and/or ITs have occurred (or none at all) for the account that provide adequate sample sizes for determining statistically reliable probabilities. Under some circumstances, a contact center may be able to compensate inadequate sample sizes for a particular contact period for an account by including historical data associated with other similar accounts for the particular contact period. However, again, this solution is also dependent on the amount of historical call attempt data that is available.

For instance, depending on the embodiment, the contact center may produce outcome/result probabilities as shown in Tables 1 and 2:

TABLE 1

Probabilities with promise-to-pay (P-to-P) and opt-out (O-O) included along with IC and IT.

| | Probabilities for Each Contact Period | | | | | |
|---|---|---|---|---|---|---|
| For Each Account | IC + P-to-P | IC + O-O | IC + Neither | IT + O-O | IT + no O-O | NR |

TABLE 2

Probabilities with P-to-P, O-O, IC, and IT separated.

| | Probability Over Entire History | | Probabilities for Each Contact Period | | |
|---|---|---|---|---|---|
| For Each Account | P-to-P | O-O | IC | IT | NR |

For the first approach shown in Table 1, six different probabilities are determined for each account over each contact period: a probability of an IC that results in a promise-to-pay, a probability of an IC that results in a request from the party to opt-out, a probability of an IC that results in neither a promise-to-pay nor a request to opt-out, a probability of an IT that results in a request from the party to opt-out, a probability of an IC that does not result in a request from the party to opt-out, and a probability of getting no response. Accordingly, this particular approach would likely require the contact center to have an extensive amount of historical call attempt data for each account (and/or similar accounts) being contacted since the probability of a IC resulting in a promise-to-pay or an opt-out request and the probability of a IT resulting in an opt-out request are broken down for a particular account with respect to the contact period.

Wherein for the second approach shown in Table 2, only three different probabilities are determined for a particular account over each contact period: a probability of receiving an IC, a probability of receiving an IT, and a probability of getting no response. For this approach, only a single probability of a contact resulting in a promise-to-pay and a single probability of a contact resulting in an opt-out request are determined for each account over the entire history for the account without considering the contact period. Thus, this particular approach would not likely require as extensive an amount of historical contact attempt data as the first approach.

Once the desired outcome/result probabilities are determined for each account, the next Step 230 in the process 200 involves determining the resources available for each contact period. For various embodiments, this step generally involves determining the number of agents that will be available during each particular contact period to field inbound calls and text messages received as a result of sending the limited-content text messages. Thus, depending on the embodiment, this determination may involve reviewing one or more schedules to ascertain the number of agents scheduled to work during each contact period. In addition, this determination may involve taking into consideration typical daily activities of agents that detract from fielding inbound calls and text messages such as breaks, lunch, training, and time spent idling, performing wrap-up work following a call or text, and/or fielding other types of communications such as outbound calls. Depending on the embodiment, the times associated with each of these activities may be estimated and/or averaged based on historical data. In addition, in particular embodiments, other types of resources may be considered such as, for example, the number of available trunks for handling inbound calls and text messages.

Continuing, a contact priority value is determined for each account in Step 235. The contact priority value provides a measure of the desirability (importance) of contacting the account over the workday. In particular instances, the contact priority value may be a measure of the desirability of contacting the account with respect to the other accounts to be contacted over the workday. Depending on the embodiment, the contact priority value can be based on a single characteristic of the account such as the dollar amount the account is delinquent or the probability of an IC resulting in a promise-to-pay, or may be derived from multiple characteristics such as, for instance, a combination of the dollar amount delinquent, the probability of an IC resulting in a promise-to-pay, the number of days delinquent, and/or the number of delinquencies within the past year. For example, in one embodiment, the contact priority value for an account may be determined by multiplying the dollar amount delinquent, the number of days delinquent, and the number of delinquencies within the past year together and dividing this number by the amount paid by the account over the past year. Further, one or more of the characteristics may be weighted to allow for greater importance for these characteristics. Those of ordinary skill in the art can envision other characteristics and/or calculations that may be used in determining a contact priority value for an account in light of this disclosure.

Next, a cost of making a contact attempt is determined in Step 240. In various embodiments, this cost is generally defined in terms of the amount of time (e.g., duration of time) involved in handling an inbound communication (e.g., call or text) resulting from sending a limited-content text message. Thus, the cost of making a contact attempt is defined in terms of multiple values in many instances since the time required in making a contact attempt is dependent upon the outcome (e.g., IC, IT, or NR) and result (promise-to-pay, opt-out request, neither) of sending the limited-content text message. Thus, depending on the embodiment, the cost of making a contact attempt may include values for: (1) sending a limited-content text message to an account, handling an IC, and receiving a promise-to-pay; (2) sending a limited-content text message to an account, handling an IC, and receiving an opt-out request; (3) sending a limited-content text message to an account, handling an IC, and receiving neither a promise-to-pay nor an opt-out request; (4) sending a limited-content text message, handling an IT, and receiving an opt-out request; (5) sending a limited-content text message, handling an IT, and not receiving an opt-out request; and (6) sending a limited-content text messages and receiving no response. Depending on the embodiment, each of these values may be estimated and/or averaged based on historical data for each outcome and result.

Once the outcome/result probabilities have been determined for each account and each contact period, the contact priority value have been determined for each account, and the values have been determined for the cost of making a contact attempt, a contact attempt value is generated for each account for each contact period in Step 245. This contact priority value represents a relative desirability of making a contact attempt for a particular account in a particular contact period. Thus, in various embodiments, generating the contact priority values involves maximizing over all accounts and all contact periods the relative account priority value, probability of an IC (and in some instances a promise-to-pay and a request to opt-out), probability of an IT (and in some instances a request to opt-out) and proportion of the particular account sent texts during a particular contact period.

Note that an important factor considered in various embodiments is the amount of time the party associated with a particular account is expected to take before responding to the limited-content text message. Specifically, the time period in which the inbound communication (e.g., call or text message) is expected to be received from the party with respect to the time period in which the limited-content text message is sent to the party. Often times a party is likely to respond to a received text message, if the party responds at all, in a short amount of time after receiving the text message. Therefore, the inbound communication received from the party often times occurs in the same time period as the time period the limited-content text message was sent to the party.

However, this is not always the case. For example, the text message may be sent to the party while the party is at work and does not have the time at that moment to place a call to the contact center. Instead, the party may wait a few hours and call the contact center after the party has left work for the day. Therefore, the resources used to field the inbound call from the party are the resources available in a time period other than the time period in which the limited-content text message was sent to the party. Accordingly, in various embodiments, the resources available for the time period in which the inbound communication is expected to be received from the party is considered in determining the contact attempt value for each account for each time period, although the time period is which the communication is received may not be the same time period in which the text message was sent to the party.

At this point, the contact attempt value for each contact period is associated with its respective account to create a texting list (e.g., optimal schedule) for sending out limited-content text messages for the workday in Step 250. Thus, for any contact period, the texting list provides a sequential list of contacts in descending order with respect to desirability to send the contact a limited-content text message during the particular contact period based on the contact attempt values generated for the accounts for the particular contact period.

Accordingly, the different texting lists for each time period may be used in sending the parties associated with the accounts found on the texting lists limited-content text messages. In particular embodiments, an account may be eliminated from texting lists for later time periods once a limited-content text message has been sent to the party associated with the account in a particular period, depending on the result of sending the text message. For instance, if the party has responded to the text message by placing an inbound call to the contact center, then the account may be removed from texting lists for future time periods. Likewise, if the party has responded to the text message by opting out of receiving any further such texts, then the account may be removed from texting lists for future time periods.

While in particular embodiments, an account may be removed from a certain number of future texting lists as a result of receiving no response from the party after sending the party a limited-content text message. For example, an account may be removed from the texting lists for the next five consecutive time periods after sending a text message to the party and receiving no response. This may be done to avoid the text messages from becoming a nuisance. Note also that in particular embodiments, the expected time for the party to respond may be considered in determining whether to remove an account from a texting list for a future time period.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Historical Contact Attempt Data Update Module

Figure 3:
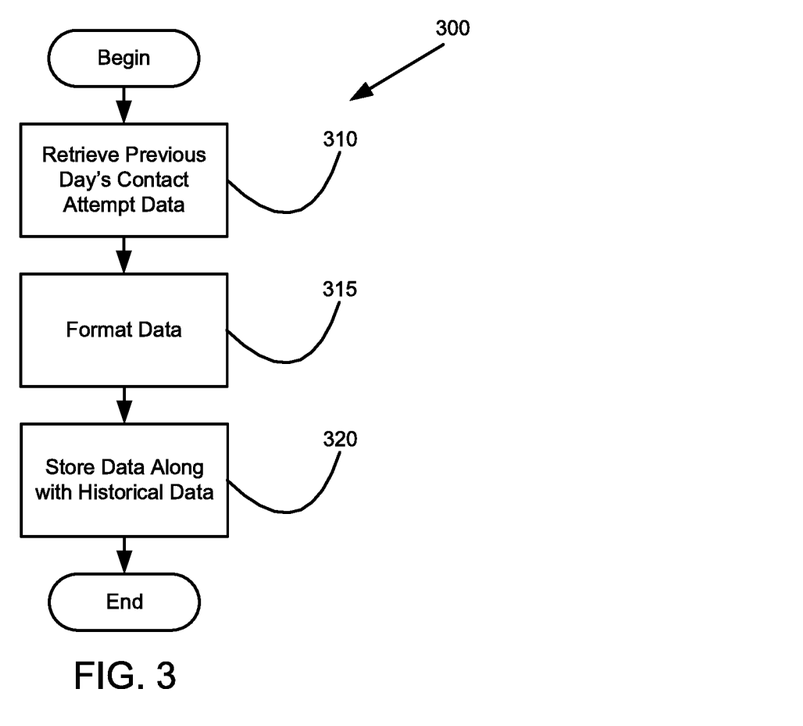
FIG. 3 illustrates a process flow for updating historical contact attempt data according to various embodiments of the invention.

FIG. 3 provides additional details regarding a process flow for updating the historical contact attempt data based on data for a previous workday's contact attempts according to various embodiments of the invention. Accordingly, FIG. 3 provides a flow diagram showing a historical contact attempt data update ("HCADU") module for performing such functionality according to various embodiments of the invention. More specifically, the flow diagram shown in FIG. 3 may correspond to operations carried out by a processor of a component within the contact center's architecture 100, such the CM server 150, as it executes the HCADU module stored in the component's volatile and/or nonvolatile memory. As previously mentioned, the HCADU module may be configured to carry out the process 300 shown in FIG. 3 during a time that does not interfere with contact center operation. For example, in particular embodiments, the HCADU module carries out the process 300 shown in FIG. 3 as a nightly "batch job."

Turning now to FIG. 3, the process 300 involves retrieving the previous workday's contact attempt data in Operation 310. Depending on the embodiment, the previous workday's contact attempt data may be stored in any number of different types of media such as non-volatile data storage located within the contact center architecture 100 or non-volatile or volatile storage residing on a component within the contact center architecture 100. For instance, in one embodiment, one or more contact devices 131 may save such information on local volatile memory as limited-content text messages are sent and/or inbound calls and text messages are fielded by the contact devices 131 during the previous day.

The previous workday's contact attempt data may include information on each limited-content text message sent during the previous workday such as, for instance, information on the account associated with a text message sent, the time the message was set, the outcome of sending the message, and/or the result of the contact attempt if an inbound call or text message was received as a result of sending the message. Further, the previous workday's contact attempt information may originate from more than one source. For instance, in particular embodiments, some parts of the contact attempt information may originate from a contact device 131 while other parts of the information may originate from the agent fielding a particular inbound call or text message resulting from sending a limited-content text message. For example, one or more contact devices 131 may provide information on the account associated with the text message, the time the text message was sent, and the outcome from sending the text message. While the agent may provide information on the result of speaking with the party if the message resulted in an inbound call from the party.

Once the previous workday's contact attempt data has been retrieved, the HCADU module formats the data in Operation 315. That is to say, in particular embodiments, the previous workday's contact attempt data may be in a raw form that needs to be properly formatted so it may be saved permanently along with the historical contact attempt data. Thus, for these embodiments, the HCADU module formats the previous workday's contact attempt data so that the form is appropriate for saving along with the historical contact attempt data. In addition, in particular embodiments, the HCADU module may also summarize the previous workday's contact attempt data to put the data in a format that may be more usable by contact center personnel. For instance, in one embodiment, the HCADU module summarizes the previous workday's contact attempt data to include a total number of limited-content text messages sent, inbound calls and text messages received as a result, and promises-to-pay and opt-out requests received from these calls and text messages.

Finally, once the previous workday's contact attempt data has been properly formatted, the HCADU module stores the formatted data along with the historical contact attempt data in Operation 320. Accordingly, this data may now be used for determining the best time to send limited-content text messages to one or more accounts for future purposes.

Best Time to Text Module

Figure 4:
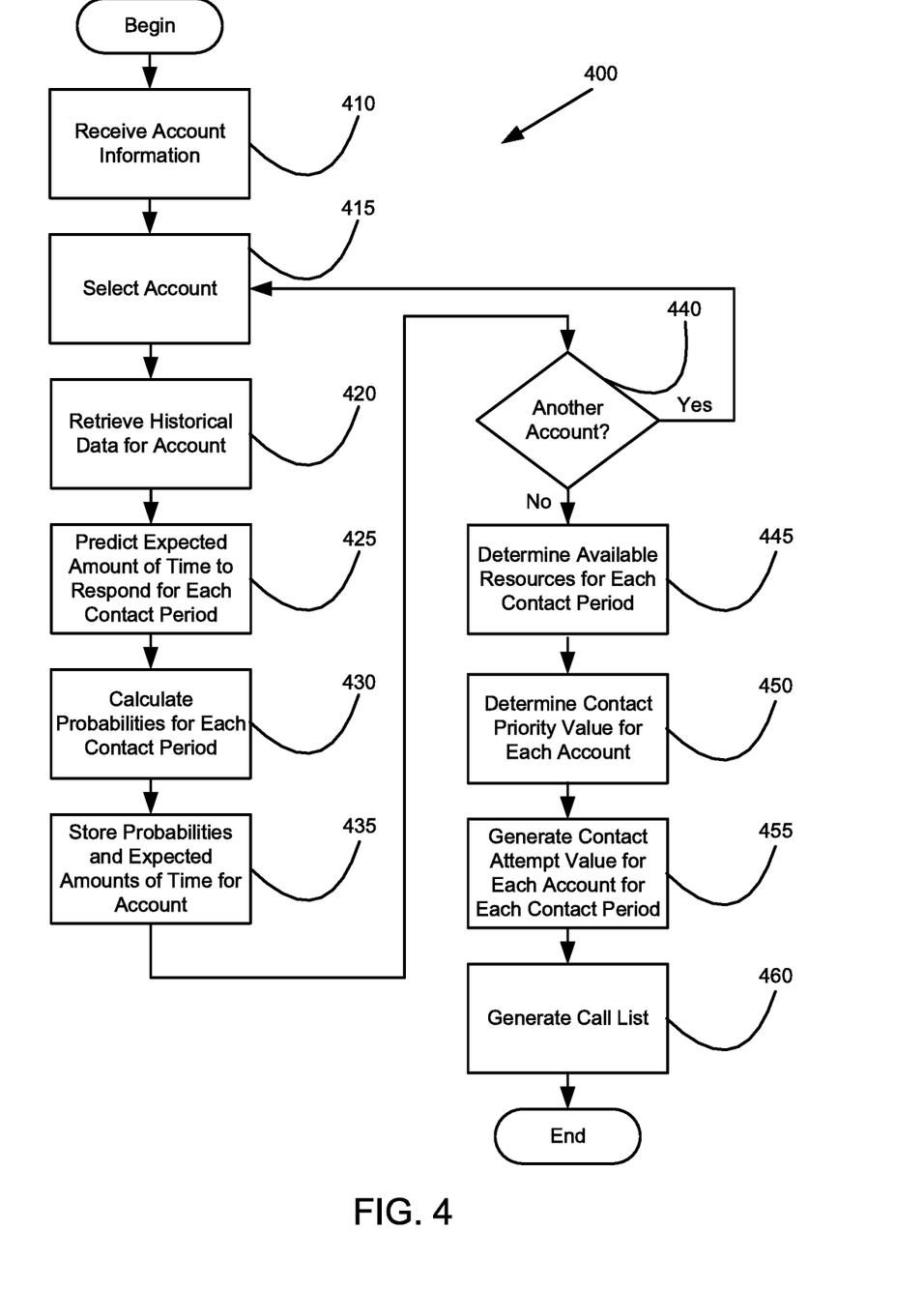
FIG. 4 illustrates a process flow for generating a texting list according to various embodiments of the invention.

Continuing, the historical contact attempt data may now be used in determining best times to text one or more accounts for future time periods. For instance, a contact center may wish to attempt to contact a number of delinquent accounts over the following workday and may wish to identify a best time to text each account. Accordingly, FIG. 4 provides additional details regarding a process flow for constructing a texting list to identify a best time to text each account in accordance with various embodiments of the invention. Specifically, FIG. 4 provides a flow diagram showing a best time to text ("BTT") module for performing such functionality according to various embodiments of the invention. Thus, the flow diagram shown in FIG. 4 may correspond to operations carried out by a processor of a component within the contact center architecture 100, such as the CM server 150, as it executes the BTT module stored in the component's volatile and/or nonvolatile memory.

Turning now to FIG. 4, the process 400 begins with the BTT module receiving account information in Operation 410. This account information is for a plurality of accounts to be sent content-limited text messages over the following workday. Thus, in particular embodiments, the account information may be provided as a standard texting list simply listing the accounts to be texted over the following workday along with corresponding information for each account. For instance, the account information for a particular account may include information on the individual associated with the account, information on the delinquency of the account such as the amount delinquent and the time length of the delinquency, and/or information on the last contact attempt made for the account such as the date and time of the attempt and the outcome of the attempt.

Next, the BTT module selects a particular account from the account information in Operation 415 and retrieves historical contact attempt data for the selected account in Operation 420. In various embodiments, the historical contact attempt data includes information on previous contact attempts made for the selected account. Thus, the historical contact attempt data may include information for each previous contact attempt made for the selected account involving sending the party associated with the account a content-limited text message such as when (e.g., date and time) the previous contact attempt was made, the outcome of the previous contact attempt, and the result of the previous contact attempt if the attempt resulted in an IC or IT.

Further, in particular embodiments, the BTT module may include information for other similar accounts in the historical contact attempt data if the data for the selected account is not considered extensive enough (e.g., large enough) for producing statistically sound probabilities for the selected account. These similar accounts may be identified by using one or more rules defined by the contact center. For instance, the contact center may define a rule that a similar account is an account with a number of days delinquent equal to or greater than the number of days delinquent from the selected account.

Next, the BTT module predicts the amount of time the party associated with the account is expected to take to respond upon receiving the limited-content text message over each contact period of the following workday in Operation 425. As previously mentioned, a contact period may be defined as any duration of time that occurs during the workday. For instance, the contact center may define the contact periods as hourly periods of time beginning at 8:00 a.m. and ending at 8:00 p.m. Thus, in this instance, the BTT module calculates the expected amount of time to respond for the selected account for each hourly contact period beginning at 8:00 a.m. and ending at 8:00 p.m.

Here, the expected amount of time to respond is dependent on the contact period in which the limited-content text message is sent to the party. For example, the party may have a job that he or she works Monday thru Friday starting at 8:00 a.m. until 5:00 p.m. In this instance, the party is not allowed to place personal calls during the hours he or she is working. Therefore, if a limited-content text message were to be sent to the party at 9:00 a.m., then the party would not have an opportunity to respond to the message until after 5:00 p.m., resulting in an expected amount of time to respond of at least eight hours depending on when the party normally responds to text messages after getting off work. However, if the limited-content text message were to be sent to the party at 6:00 p.m. instead, then the party may respond to the text message almost immediately after receiving it, resulting in an expected amount of time to respond that is much shorter. However, with that said, in other embodiments, only a single expected amount of time to respond may be predicted for each account, regardless of which of the contact periods the limited-content text message is sent to the party.

The BTT module may be configured to predict the expected amount of time to respond using different approaches depending on the embodiment. For instance, in particular embodiments, the BTT module may be configured to simply calculate the average amount of time the party has taken to respond to limited-content text messages in the past. While in other instances, the BTT module may be configured to make use of one or more predictive models that predict the expected amount of time to respond. For example, the BTT module may make use of one or more of Bayesian networks, clustering, neural networks, and/or reinforcement learning to name a few, in various embodiments. Again, the BTT module may be configured to apply the approach to each contact period or over the entire contact period depending on the embodiment.

Once the BTT module has predicted the appropriate expected amount(s) of time to respond, the BTT module calculates one or more outcome/result probabilities for the selected account over each contact period of the following workday in Operation 430. Again, if the contact center has defined the contact periods as hourly periods of time beginning at 8:00 a.m. and ending at 8:00 p.m., then the BTT module would calculate the appropriate probabilities for the selected account for each hourly contact period beginning at 8:00 a.m. and ending at 8:00 p.m.

Here, as previously mentioned, the contact center may decide to use probabilities for each time period that are outcome based or both outcome and result based. Thus, depending on the embodiment, the BTT module may be configured to calculate probabilities for the selected account over each contact period with respect to: (1) an IC; (2) an IT; and (3) a NR, or with respect to: (1) an IC resulting in a promise-to-pay; (2) an IC resulting in a request to opt-out; (3) an IC resulting in neither a promise-to-pay nor a request to opt-out; (4) an IT resulting in a request to opt-out; (5) an IT not resulting in a request to opt-out; and (6) a NR.

The probability models used may be developed using any suitable method. For instance, in particular embodiments, the probability models are developed by applying a stepwise polytomous logistic regression technique. For example, a random sample containing the three different outcomes, an IC (group G1), an IT (group G2), and a NR (group G3), is drawn from the historical contact attempt data and given the random sample $X=(x_1, x_2,$ through $x_n)$ where $X_1$ is an account in the sample (an m-dimensional vector whose components are the candidate characteristics), the likelihood function for a set of m-dimensional vectors a, and b is defined as follows:

$L(a,b,c) = \Pi \exp(a^T x_i)/(1+\exp(a^T x_i)+\exp(b^T x_i)) \times$
  $i \in G1$
  $\Pi \exp(b^T x_i)/(1+\exp(a^T x_i)+\exp(b^T x_i)) \times$
  $i \in G2$
  $\Pi 1/(1+\exp(a^T x_i)+\exp(b^T x_i))$
  $i \in G3$ "a" is the IC score and "b" is the IT score.

In this instance, the modeling process involves a series of steps in which characteristics are added to the models. At each step of the modeling process, the adjusted chi-squared statistics for all of the variables for either of the two possible scores not in the model are computed and examined. If the largest of these statistics is significant at a defined level, the variable is entered into a model and is never removed from the model. This stepwise process of entering variables into the models is continued until none of the remaining variables meet the defined significance test, in the preferred case 99%. After the models are constructed, the intercepts are adjusted to reflect the true proportions of the three categories, rather than those represented in the sample. Once the probability models are built, model parameters are produced in terms of a series of characteristics associated with a weighting factor or score.

Accordingly, the BTT module calculates the probability values by matching characteristics from the selected account to the model parameters and then converting the resultant model value to a probability between zero and one. Although the outcome probabilities may be defined as an IC probability and a non-IC probability, the preferred form defines three probabilities for three potential outcomes comprising an IC probability, an IT probability, and a NR probability, the latter representing the probability of all outcomes other than an IC or an IT.

Once the BTT module calculates the required probabilities for the selected account for each of the contact periods, the BTT module stores the outcome/result probabilities for each of the contact periods for the account in Operation 435. Depending on the embodiment, the BTT module may store the probabilities in volatile or non-volatile memory. In particular embodiments, additional information may be stored along with the outcome/result probabilities such as a probability of obtaining a promise-to-pay and a probability of obtaining a request to opt-out if an inbound call or text results from sending the limited-content text message.

At this point, the BTT module determines whether another account is found in the account information in Operation 440. If so, then the BTT module returns to Operation 415 and selects the next account from the account information. The BTT module then repeats the operations described above with respect to the newly selected account.

Once the BTT module has processed all of the accounts from the account information, the BTT module determines the resources available for each contact period in Operation 445. In general, the resources available during a particular contact period define the number of inbound calls and text messages that can be handled during the particular contact period. In various embodiments, the resources available for a contact period are typically viewed as the amount of time contact center agents are available to handle inbound calls and text messages during the contact period. However, in particular embodiments, other types of resources may be considered. For instance, in one embodiment, the resources available for a particular contact period may also consider the number of trunks that are available to handle inbound calls and text messages during the particular contact period.

Accordingly, in various embodiments, the BTT module may review one or more schedules to ascertain the number of agents scheduled to work during each contact period. In addition, the BTT module may take into consideration typical daily activities of agents that detract from fielding inbound calls and text messages such as breaks, lunch, training, and time spent idling, performing wrap-up work following a call or text, and/or fielding other communications such as outbound calls. For instance, in one embodiment, the contact center defines set times or determines historical averages for these daily activities and the BTT module then uses these set times and averages in determining the amount of time that is available for agents to handle calls during each contact period. For example, ten agents may be scheduled to work during a contact period that is to take place from 9:00 a.m. to 9:59 a.m. During this contact period, five of the agents are scheduled to take a fifteen minute break at 9:30 a.m. Thus, the BTT module would determine that the resources available for this time period involve five agents fielding inbound calls and text messages for fifty-nine minutes and five agents fielding inbound calls and text messages for forty-four minutes and thus, would amount to five hundred and fifteen total minutes of agent availability to handle inbound calls and text messages during the contact period.

In addition, in various embodiments, the contact center also defines a cost of making a contact attempt. Similar to the available resources, the cost of making a contact attempt is generally defined in terms of the amount of time (e.g., duration of time) involved in sending the limited-content text message and handling the resulting inbound call or text message. Accordingly, the contact center may define the cost of making a contact attempt in terms of multiple values in many instances since the time required in handling the resulting inbound call or text message is dependent upon the outcome (e.g., IC, IT, or NR) and result (promise-to-pay, request to opt-out, or neither) of the call or text message. Depending on the embodiment, the contact center may estimate and/or calculate an average for each of these values based on historical data for each type of outcome and result.

For instance, in one embodiment, the contact center determines average times for handling an inbound call or text message with respect to sending a limited-content text message resulting in: (1) an IC and a promise-to-pay; (2) an IC and a request to opt-out; (3) an IC and neither a promise-to-pay nor a request to opt-out; (4) an IT and a request to opt-out; (5) an IT and not a request to opt-out; and (6) a NR. As one can see, each determined value represents a cost (e.g., an amount of time) associated with sending the limited-content text message that results in a particular outcome (e.g., IC, IT, or NR) and for ICs and ITs, a particular result (e.g., promise-to-pay, request to opt-out, or neither). As will be shown, these determined values are then used by the BTT module in generating a texting list for various accounts and the workday.

Continuing, in Operation 450, the BTT module determines the contact priority value for each account. As previously mentioned, the contact priority value provides a measure of the importance of contacting an account, and this importance can be with respect to the other accounts to be contacted over the workday. Depending on the embodiment, the contact center may base the contact priority value on a single characteristic of the account or on multiple characteristics of the account. For instance, in particular embodiments, the contact center may simply consider the dollar amount the account is delinquent or the probability of an IC resulting in a promise-to-pay. While in other embodiments, the contact center may consider multiple characteristics such as a combination of the dollar amount delinquent, the probability of an IC resulting in a promise-to-pay, the number of days delinquent, and/or the number of delinquencies within the past year. Further, one or more of the characteristics may be weighted to allow for greater importance for these characteristics. Accordingly, the BTT module determines the contact priority value for each account based on the identified characteristics. For example, in one embodiment, the BTT module determines the contact priority value for each account by multiplying the dollar amount delinquent, the number of days delinquent, and the number of delinquencies within the past year for the account and dividing this number by the amount paid by the account over the past year.

Next, the BTT module generates a contact attempt value for each account for each contact period in Operation 455. As previously mentioned, the contact priority value represents a relative desirability of making a contact attempt for a particular account in a particular contact period. Accordingly, in various embodiments, generating the contact priority values involves maximizing over all accounts and all contact periods the account priority value, probability of IC (and in some instances promise-to-pay), and proportion of a particular account called during a particular contact period.

For instance, in particular embodiments, the basic problem can be expressed in terms of a linear program:

$$(LP1) \max_{X_{it}} \Sigma_t \Sigma_i C_{it} X_{it} IC_{it} IT_{it}$$

With the constraints $\forall i,t: X_{it} \geq 0$ $\forall i: \Sigma_t X_{it} \leq 1$ $\forall t: \Sigma_i (ticp(IC_{it}) + tico(IC_{it}) + ticn(IC_{it}) + tito(IT_{it}) + titn(IT_{it}) + tnr(NR_{it}))IC_{it} + IT_{it} \leq h_{t+n}$ Where i=account 1 . . . N t=contact period 1 . . . T n=expected amount of time to respond $X_{it}$=proportion of account i sent text messages during contact period t $IC_{it}$=probability of account i placing an inbound call based on a text message being sent to account i during contact period t $IT_{it}$=probability of account i replying with a text message based on a text message being sent to account i during contact period t $NR_{it}$=probability of account i not responding to a text message sent to account i during contact period t ticp=average duration of contact attempt resulting in an IC and a promise to pay tico=average duration of contact attempt resulting in an IC and a request to opt-out ticn=average duration of contact attempt made resulting in an IC and neither a promise to pay nor a request to opt-out tito=average duration of contact attempt resulting in an IT and a request to opt-out titn=average duration of contact attempt resulting in an IT and no request to opt-out tnr=average duration of contact attempt resulting in no response $h_{t+n}$=resources available during the contact period that occurs with respect to contact period t+n $C_{it}$=priority value for account i during contact period t The nature of the solution to this linear program guarantees that a solution exists that is essentially integer, either 0 or 1. The linear program can be solved with a general solution process, for example simplex, an interior point method, or preferably using a Lagrangian function.

Finally, in Operation 460, the BTT module generates a texting list to use for the workday. Accordingly, in various embodiments, the BTT module accomplishes this task by associating the contact attempt value for each contact period with its respective account to create the texting list. As a result, in particular embodiments, the BTT module sorts the accounts based on contact attempt values and provides a sequential list of contacts for each contact period in descending order with respect to desirability to send the accounts limited-content text messages during the contact period. While in other embodiments, the texting list simply identifies an optimal contact period for each account without the accounts being sorted sequentially. Thus, the texting list essentially provides a best time to text each account with respect to a time of the workday (e.g., contact period).

Depending on the embodiment, the texting list may only include a particular account once with respect to a single contact period or multiple times with respect to multiple contact periods. For instance, in particular embodiments, the texting list may only include each particular account once to be sent a text message during a single contact period (e.g., the contact period having the highest contact attempt value for the account) for the workday to ensure that a limited-content text message is sent to the account during the best time to text the account.

While in other embodiments, the texting list may include a sequential list for each contact period that includes each account. Accordingly, for these embodiments, the contact center may begin at the beginning of the sequential list of accounts for a particular contact period and work down through the list, sending text messages to the accounts, until the contact period expires. At that point, the contact center may then move on to the sequential list for the next contact period and begin at the top of this sequential list to send text to the accounts accordingly during the next contact period.

For example, a texting list may include an account in a first contact period near the top of the sequential list of contacts ensuring that a text message will likely be sent to the account during the first contact period. In addition, the texting list may also include the account in a second, later contact period near the top of the sequential list of contacts also ensuring that a text message will likely be sent to the account during the second, later contact period. In this example, when a text message is to be sent to this account during the second, later contact period the contact center may check to determine whether a text message should actually be sent to the account during the second, later contact period. For instance, the contact center may determine whether a text message was actually sent to the account during the first contact period and if so, what were the outcome and/or result of that text message.

Further, in particular embodiments, the texting list may be generated based on multiple optimization windows defined by the contact center in which an attempt to contact each account may be made once for each optimization window. Accordingly, for this type of texting list, the list identifies the best contact period for each account with respect to each optimization window. For example, the contact center may identify two optimization windows. The first window may run from 8:00 a.m. until 1:59 p.m. and the second window may run from 2:00 p.m. to 8:00 p.m. Thus, in this instance, the texting list identifies a first contact period (e.g., best time to text) between 8:00 a.m. and 1:59 p.m. for each account in which a first text message should be sent to the account and a second contact period (e.g., best time to text) between 2:00 p.m. and 8:00 p.m. for each account in which a second text message should be sent to the account. Similar to the approach of having a texting list that includes a sequential list for each contact period that includes each account, the contact center may check to determine whether an account should actually be sent a text message during the second contact period between 2:00 p.m. and 8:00 p.m.

Exemplary Computer Processing Device

Figure 5:
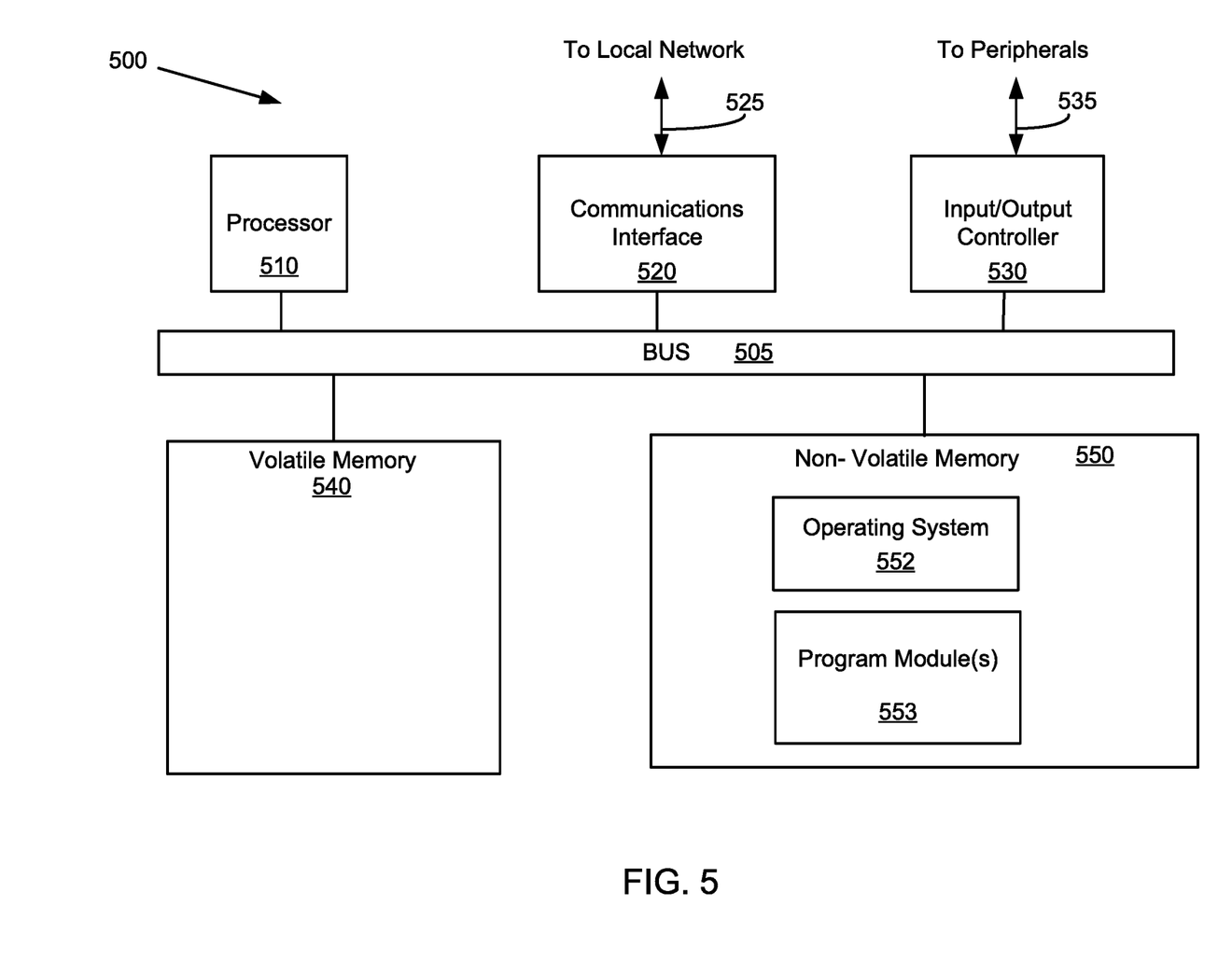
FIG. 5 illustrates one embodiment of a processing device used to practice the technologies disclosed herein.

FIG. 5 is an exemplary schematic diagram of a computer processing system that may be used in an embodiment of the contact center architecture 100 to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 5, the processing system 500 may include one or more processors 510 that may communicate with other elements within the processing system 500 via a bus 505. The processor 510 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 500 may also include one or more communications interfaces 520 for communicating data via the local network 170 with various external devices, including those shown in FIG. 1. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 530 may also communicate with one or more input devices or peripherals using an interface 535, such as, but not limited to: a keyboard, a mouse, a touch screen/display input, microphone, pointing device, etc. The input/output controller 530 may also communicate with output devices or peripherals, such as displays, printers, speakers, headsets, banner displays, etc. These may be used, in part, to receive Administrator input, including for interacting with the manual agent selection module.

The processor 510 may be configured to execute instructions stored in volatile memory 540, non-volatile memory 550, or other forms of computer readable storage media accessible to the processor 510. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 550 may store program code and data, which also may be loaded into the volatile memory 540 at execution time. Specifically, the non-volatile memory 550 may store one or more program modules 553 such as the HCADU module and/or the BTT module that may perform the above-mentioned process flows and/or operating system code 552 containing instructions for performing the process and/or functions associated with the technologies disclosed herein. These program modules 553 may also access, generate, or store information such as, for example, contact attempt data in the non-volatile memory 550, as well as in the volatile memory 540. The volatile memory 540 and/or non-volatile memory 550 may be used to store other information including, but not limited to: records, applications, programs, scripts, source code, object code, byte code, compiled code, interpreted code, machine code, executable instructions, or the like. These may be executed or processed by, for example, processor 510. These may form a part of, or may interact with, the program modules 553.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for determining a best time to send a text message to a party over a plurality of contact periods of time to achieve having the party respond to the text message with at least one of a desired outcome and a desired result, the method comprising:

for each of the contact periods of time:
determining an amount of time the party is expected to take to respond to the text message as a result of sending the text message to the party during the contact period of time;
determining a cost of sending the text message to the party during the contact period of time;
generating a probability of the party responding to the text message being sent during the contact period of time with at least one of the desired outcome and the desired result; and
generating a contact attempt value based on a desirability of sending the text message to the party during the contact period of time, the probability of the party responding to the text message being sent during the contact period of time with at least one of the desired outcome and the desired result, the resources available for handling at least one of the desired outcome and the desired result during a time in which the party is expected to respond to the text message based on the amount of time the party is expected to take to respond to the text message as the result of sending the text message to the party during the contact period of time, and the cost of sending the text message to the party during the contact period of time; and identifying the best time to send the text message to the party as the contact period of time from the plurality of contact periods of time having the highest contact attempt value.

2. The method of claim 1 further comprising sending a text message to the party during the best time to send the text message to the party.

3. The method of claim 1, wherein the contact periods of time for the plurality of contact periods of time comprise consecutive one-hour segments of time.

4. The method of claim 1, wherein the desired outcome comprises the party placing an inbound call and the desired result comprises the party providing a promise-to-pay on a delinquent payment.

5. The method of claim 1, wherein the party is one of a plurality of parties to receive text messages over the plurality of contact periods of time and the desirability of sending the text message to the party during the contact period of time is relative to a desirability of sending a text message to each of the plurality of parties during the contact period of time.

6. The method of claim 1, wherein determining the amount of time the party is expected to take to respond to the text message as the result of sending the text message to the party during the contact period of time comprises predicting the amount of time based on one or more predictive models.

7. The method of claim 1, wherein the resources comprise personnel to handle at least one of the desired outcome and the desired result and determining the resources available for handling at least one of the desired outcome and the desired result during the time in which the party is expected to respond to the text message involves reviewing schedules to ascertain a number of personnel scheduled to work during the time.

8. A non-transitory, computer-readable medium comprising computer-executable instructions for determining a best time to send a text message to a party over a plurality of contact periods of time to achieve having the party respond to the text message with at least one of a desired outcome and a desired result, the computer-executable instructions when executed by at least one computer processor cause the at least one computer processors to:
  for each of the contact periods of time:
    determine an amount of time the party is expected to take to respond to the text message as a result of sending the text message to the party during the contact period of time;
    determine a cost of sending the text message to the party during the contact period of time;
    generate a probability of the party responding to the text message being sent during the contact period of time with at least one of the desired outcome and the desired result; and
    generate a contact attempt value based on a desirability of sending the text message to the party during the contact period of time, the probability of the party responding to the text message being sent during the contact period of time with at least one of the desired outcome and the desired result, the resources available for handling at least one of the desired outcome and the desired result during a time in which the party is expected to respond to the text message based on the amount of time the party is expected to take to respond to the text message as the result of sending the text message to the party during the contact period of time, and the cost of sending the text message to the party during the contact period of time; and
  identify the best time to send the text message to the party as the contact period of time from the plurality of contact periods of time having the highest contact attempt value.

9. The non-transitory, computer-readable medium of claim 8, wherein the computer-executable instructions when executed by the at least one computer processor further cause the at least one computer processor to have a text message sent to the party during the best time to send the text message to the party.

10. The non-transitory, computer-readable medium of claim 8, wherein the contact periods of time for the plurality of contact periods of time comprise consecutive one-hour segments of time.

11. The non-transitory, computer-readable medium of claim 8, wherein the desired outcome comprises the party placing an inbound call and the desired result comprises the party providing a promise-to-pay on a delinquent payment.

12. The non-transitory, computer-readable medium of claim 8, wherein the party is one of a plurality of parties to receive text messages over the plurality of contact periods of time and the desirability of sending the text message to the party during the contact period of time is relative to a desirability of sending a text message to each of the plurality of parties during the contact period of time.

13. The non-transitory, computer-readable medium of claim 8, wherein the computer-executable instructions when executed by the at least one computer processor cause the at least one computer processor to determine the amount of time the party is expected to take to respond to the text message as the result of sending the text message to the party during the contact period of time by predicting the amount of time based on one or more predictive models.

14. The non-transitory, computer-readable medium of claim 8, wherein the resources comprise personnel to handle at least one of the desired outcome and the desired result and the computer-executable instructions when executed by the at least one computer processor cause the at least one computer processor to determine the resources available for handling at least one of the desired outcome and the desired result during the time in which the party is expected to respond to the text message involves reviewing schedules to ascertain a number of personnel scheduled to work during the time.

15. A system for determining a best time to send a text message to a party over a plurality of contact periods of time to achieve having the party respond to the text message with at least one of a desired outcome and a desired result, the system comprising:
  at least one computer processor configured to:
    for each of the contact periods of time:
      determine an amount of time the party is expected to take to respond to the text message as a result of sending the text message to the party during the contact period of time;
      determine a cost of sending the text message to the party during the contact period of time;
      generate a probability of the party responding to the text message being sent during the contact period of time with at least one of the desired outcome and the desired result; and
      generate a contact attempt value based on a desirability of sending the text message to the party during the contact period of time, the probability of the party responding to the text message being sent during the contact period of time with at least one of the desired outcome and the desired result, the resources available for handling at least one of the desired outcome and the desired result during a time in which the party is expected to respond to the text message based on the amount of time the party is expected to take to respond to the text message as the result of sending the text message to the party during the contact period of time, and the cost of sending the text message to the party during the contact period of time; and
    identify the best time to send the text message to the party as the contact period of time from the plurality of contact periods of time having the highest contact attempt value.

16. The system of claim 15, wherein the at least one computer processor configured to have a text message sent to the party during the best time to send the text message to the party.

17. The system of claim 15, wherein the contact periods of time for the plurality of contact periods of time comprise consecutive one-hour segments of time.

18. The system of claim 15, wherein the desired outcome comprises the party placing an inbound call and the desired result comprises the party providing a promise-to-pay on a delinquent payment.

19. The system of claim 15, wherein the party is one of a plurality of parties to receive text messages over the plurality of contact periods of time and the desirability of sending the text message to the party during the contact period of time is relative to a desirability of sending a text message to each of the plurality of parties during the contact period of time.

20. The system of claim 15, wherein the at least one computer processor is configured to determine the amount of time the party is expected to take to respond to the text message as the result of sending the text message to the party during the contact period of time by predicting the amount of time based on one or more predictive models.

21. The system of claim 15, wherein the resources comprise personnel to handle at least one of the desired outcome and the desired result and the at least one computer processor is configured to determine the resources available for handling at least one of the desired outcome and the desired result during the time in which the party is expected to respond to the text message involves reviewing schedules to ascertain a number of personnel scheduled to work during the time.

* * * * *